(12) United States Patent
Watanabe et al.

(10) Patent No.: US 7,864,638 B2
(45) Date of Patent: Jan. 4, 2011

(54) OPTICAL DISK APPARATUS

(75) Inventors: Katsuya Watanabe, Nara (JP); Akira Yoshikawa, Nara (JP); Shin-ichi Yamada, Osaka (JP); Junichi Minamino, Nara (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 11/575,312

(22) PCT Filed: Oct. 20, 2005

(86) PCT No.: PCT/JP2005/019331

§ 371 (c)(1),
(2), (4) Date: Mar. 15, 2007

(87) PCT Pub. No.: WO2006/046469

PCT Pub. Date: May 4, 2006

(65) Prior Publication Data

US 2007/0253305 A1    Nov. 1, 2007

(30) Foreign Application Priority Data

Oct. 25, 2004   (JP)   ............................. 2004-309381

(51) Int. Cl.
*G11B 7/00*   (2006.01)
(52) U.S. Cl. .............. 369/44.29; 369/44.35; 369/44.36; 369/94
(58) Field of Classification Search ................ 369/30.2, 369/44.29, 44.35, 44.36
See application file for complete search history.

(56) References Cited

U.S. PATENT DOCUMENTS 5,105,406 A * 4/1992 Imanaka ................... 369/44.28

(Continued)

FOREIGN PATENT DOCUMENTS

JP    08-235586    9/1996

(Continued)

OTHER PUBLICATIONS

Decision on Grant dated Jul. 23, 2008 for corresponding Russian Patent Application No. 2007119399 and a partial English translation thereof.

(Continued)

*Primary Examiner*—Wayne R Young
*Assistant Examiner*—Brenda Bernardi
(74) *Attorney, Agent, or Firm*—Renner, Otto, Boisselle & Sklar, LLP

(57) ABSTRACT

An optical disk apparatus according to the present invention is capable of reading data from an optical disk 102 which has a plurality of information recording layers, including a first information recording layer whose distance from a disk surface is relatively small and a second information recording layer whose distance from the disk surface is relatively large. This optical disk apparatus includes: a focus control section 117 for causing a converging point of the light beam to be positioned on an arbitrary information recording layer of the optical disk 102; a tracking control section 118 for causing the converging point of the light beam to be positioned on a predetermined track of the information recording layer; and a gain switching section 108 capable of changing gain characteristics of at least one of the focus control section 117 and the tracking control section 118. The gain switching section 108 prescribes a gain crossover frequency when reading data from the first information recording layer to be a value which is lower than a gain crossover frequency when reading data from the second information recording layer.

5 Claims, 8 Drawing Sheets

U.S. PATENT DOCUMENTS

| | | | |
|---|---|---|---|
| 5,859,824 A | 1/1999 | Izumi et al. | |
| 6,061,310 A * | 5/2000 | Iida | 369/44.27 |
| 6,208,597 B1 | 3/2001 | Yoshimi | |
| 6,240,054 B1 * | 5/2001 | Takeya et al. | 369/44.29 |
| 6,552,971 B2 * | 4/2003 | Iida | 369/44.29 |
| 7,193,960 B2 * | 3/2007 | Usami et al. | 369/275.4 |
| 7,263,040 B2 * | 8/2007 | Tateishi et al. | 369/44.29 |
| 7,304,919 B2 * | 12/2007 | Ando | 369/44.29 |
| 7,525,883 B2 * | 4/2009 | Yoshikawa et al. | 369/44.29 |
| 2001/0008506 A1 * | 7/2001 | Takeya et al. | 369/44.29 |
| 2001/0026507 A1 * | 10/2001 | Fujiyama | 369/44.29 |
| 2002/0159342 A1 * | 10/2002 | Ogasawara et al. | 369/44.23 |
| 2005/0007906 A1 | 1/2005 | Horinouchi et al. | |
| 2005/0052964 A1 * | 3/2005 | Fujita et al. | 369/44.29 |
| 2005/0232129 A1 * | 10/2005 | Matsumoto et al. | 369/275.2 |
| 2005/0276177 A1 * | 12/2005 | Nishiuchi | 369/44.29 |
| 2006/0002251 A1 * | 1/2006 | Yoshikawa et al. | 369/44.29 |

FOREIGN PATENT DOCUMENTS

| | | |
|---|---|---|
| JP | 09-320068 | 12/1997 |
| JP | 10-269590 | 10/1998 |
| JP | 11-039657 | 2/1999 |
| JP | 11-161977 | 6/1999 |
| JP | 2000260030 A * | 9/2000 |
| JP | 2004-220736 | 8/2004 |
| WO | 00/79525 | 12/2000 |

OTHER PUBLICATIONS

International Search Report for corresponding Application No. PCT/JP2005/019331 mailed Jan. 24, 2006.

Harumitsu Miyashita et al.; Japanese Journal of Applied Physics, vol. 43, No. 7B; "Signal Qualification Method for Partial-Response Maximum-Likelihood Read/Write Channel;" 2004; pp. 4850-4851 (cited in [0046], p. 27 of the description).

* cited by examiner

FIG. 5
L0 Layer
L1 Layer
defocus
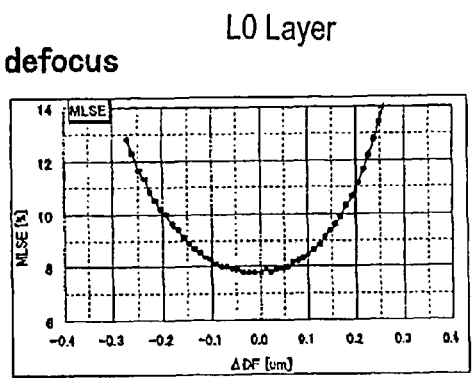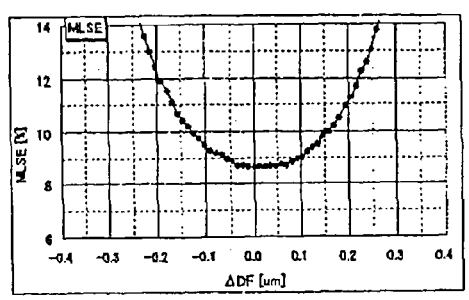
R-tilt
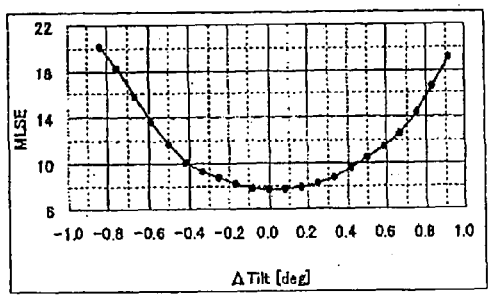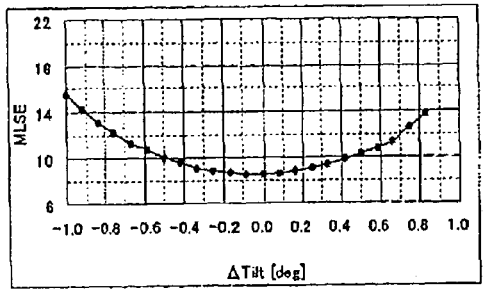
T-tilt
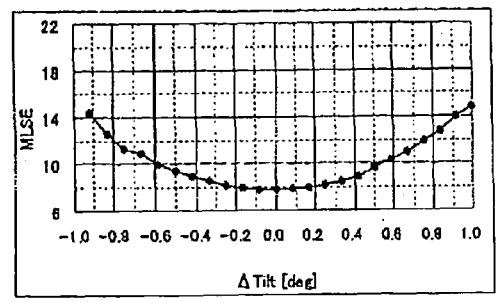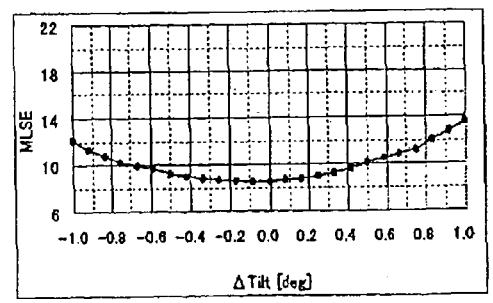

OPTICAL DISK APPARATUS

TECHNICAL FIELD

The present invention relates to an optical disk apparatus which performs at least one of: a data recording for a rotating disk-like information medium (hereinafter referred to as an "optical disk"); and a reproduction of data which is recorded on an optical disk.

BACKGROUND ART

Data which is recorded on an optical disk is reproduced by irradiating the rotating optical disk with a relatively weak light beam of a constant light amount, and detecting reflected light that has been modulated by the optical disk.

On a read-only optical disk, pits of information are prerecorded in a spiral manner during the production of the optical disk. On the other hand, in the case of a rewritable optical disk, a film of recording material which permits optical data recording/reproduction is deposited on the surface of a base material in which spiral tracks having lands or grooves are formed, by using a method such as vapor deposition. In the case where data is to be recorded on a rewritable optical disk, the optical disk is irradiated with a light beam whose light amount is modulated in accordance with the data to be recorded, thus causing local changes in the characteristics of the recording material film and effecting a data write.

Note that the depth of the pits, the depth of the tracks, and the thickness of the recording material film are smaller than the thickness of the optical disk base material. Therefore, a portion of an optical disk where data is recorded constitutes a two-dimensional surface, which may sometimes be referred to as an "information recording plane". By taking note of the fact that such an information recording plane has a physical dimension also along the depth direction, the present specification employs the term "information recording layer", instead of "information recording plane". An optical disk includes at least one such information recording layer. Note that, in reality, a single information recording layer may include a plurality of layers, such a layer of phase-changeable material, a reflective layer, etc.

When recording data on a recordable optical disk, or reproducing data which is recorded on such an optical disk, it is necessary that the light beam always has a predetermined convergence state on a target track of the information recording layer. This requires "focus control" and "tracking control". "Focus control" refers to controlling the position of an objective lens along a normal direction of the information recording layer (hereinafter referred to as the "depth direction of the substrate") so that the focal point of the light beam will always be positioned on the information recording layer. On the other hand, tracking control refers to controlling the position of an objective lens along a radial direction of the optical disk (hereinafter referred to as the "disk radial direction") so that the light beam spot will always be positioned on a predetermined track.

As conventional high-density/large-capacity optical disks, optical disks such as DVD (Digital Versatile Disc)-ROMs, DVD-RAMs, DVD-RWs, DVD-Rs, DVD+RWs, and DVD+Rs have been put to practical use. In addition, CDs (Compact Discs) are still in use. Currently, next-generation optical disks which have a higher density and a larger capacity than those of the above optical disks are being developed and put to practical applications, e.g., Blu-ray Discs (BDs). Moreover, in order to increase the capacity of data which can be recorded on a single optical disk, optical disks having a plurality of stacked information recording layers are also being developed.

Among the aforementioned optical disks, some are used in a bare state, rather than being accommodated within a cartridge. Flaws are likely to be formed and dust particles or fingerprints are likely to adhere on the surface of such an optical disk. The scratches, dust particles, and fingerprints on the surface of an optical disk behave as optical obstacles against a light beam with which the optical disk is irradiated. As a result, servo for focus control or tracking control may fail, or the amplitude of the readout signal (RF signal) may become too small, so that data recording/reproduction can no longer be stably performed.

Patent Document 1 discloses a technique of detecting scratches which are formed on an optical disk, and reducing the gains of focus servo and tracking servo while the light beam reflection is under the influence of scratches. By reducing the servo gains, the influence of scratches can be compensated for.

The technique disclosed in Patent Document 1 adopts a three beam method, where side lobes which occur due to a diffraction phenomenon caused by super resolution artifacts of a main beam are utilized. In this technique, a side lobe will move over an optical disk before a main beam does. When this side lobe passes over a scratch on the optical disk, the intensity of the reflected light increases due to the scratch. By detecting such a change in intensity, it becomes possible to reduce the gain immediately before the main beam, which follows the side lobe, passes over the scratch.

[Patent Document 1] Japanese Laid-Open Patent Publication No. 8-235586 (paragraphs 2 to 18, FIG. 1, FIG. 4)

DISCLOSURE OF INVENTION

Problems to be Solved by the Invention

The recording density of a BD is five times as much as the recording density of a DVD, and the track pitch and beam diameter of a BD are respectively reduced to about ½ and about ⅕. Therefore, without increasing the gains of focus servo and tracking servo and reducing the residues associated with the axial runout or eccentricity of the optical disk, it would be difficult to obtain an RF signal with a good quality.

Moreover, in an optical disk having two or more information recording layers (hereinafter referred to as a "multi-layered disk"), the reflectance of each information recording layer is lower than the reflectance of the information recording layer of an optical disk having one information recording layer (hereinafter referred to as a "single-layered disk"). Therefore, in a multi-layered disk, the amplitude of the RF signal is reduced, thus lowering the SN (signal-to-noise ratio). In particular, in the case of a multi-layered optical disk in which an information recording layer exists at a position near the disk surface (light-incident surface), e.g., a BD, there is a problem in that deteriorations in signal quality are particularly likely to occur due to scratches or dust particles on the disk surface, as will be specifically described later. This becomes especially prominent when a bare BD is used, without any casing such as a disk cartridge being employed.

The present invention has been made in view of the aforementioned problems, and a main objective thereof is to provide an optical disk apparatus which is immune to scratches and soil on the disk surface and which provides an RF signal with a good quality.

Means for Solving the Problems

An optical disk apparatus according to the present invention is an optical disk apparatus capable of reading data from an optical disk which has a plurality of information recording layers, including a first information recording layer whose distance from a disk surface is relatively small and a second information recording layer whose distance from the disk surface is relatively large, comprising: a light source for radiating a light beam; a lens for converging the light beam radiated from the light source; focus control means for causing a converging point of the light beam to be positioned on an arbitrary information recording layer of the optical disk; tracking control means for causing the converging point of the light beam to be positioned on a predetermined track of the information recording layer; and gain setting means capable of changing gain characteristics of at least one of the focus control means and the tracking control means, wherein, the gain setting means prescribes a gain crossover frequency when reading data from the first information recording layer to be a value which is lower than a gain crossover frequency when reading data from the second information recording layer.

In a preferred embodiment, when making a move of the converging point of the light beam from a current information recording layer to another target information recording layer, the gain crossover frequency is changed, before the move of the converging point is completed, from a value for the current information recording layer to a value for the other target information recording layer.

In a preferred embodiment, a distance between the disk surface and the second information recording layer is 100 μm or less.

In a preferred embodiment, the gain setting means stores a parameter defining gain characteristics for the plurality of information recording layers.

In a preferred embodiment, at booting, a learning for adjusting the parameter in accordance with each mounted optical disk is performed.

Another optical disk apparatus according to the present invention is an optical disk apparatus capable of reading data from an optical disk which has a plurality of information recording layers, including a first information recording layer whose distance from a disk surface is relatively small and a second information recording layer whose distance from the disk surface is relatively large, comprising: a light source for radiating a light beam; a lens for converging the light beam radiated from the light source; focus control means for causing a converging point of the light beam to be positioned on an arbitrary information recording layer of the optical disk; tracking control means for causing the converging point of the light beam to be positioned on a predetermined track of the information recording layer; means for generating a readout signal from the light beam having been reflected from the information recording layer; filtering means for cutting off a specific frequency band contained in the readout signal; and gain setting means for changing a high-frequency gain of the filtering means in frequencies of 1 MHz and above, wherein, the gain setting means prescribes a high-frequency gain when reading data from the first information recording layer to be a value which is higher than a high-frequency gain when reading data from the second information recording layer.

Still another optical disk apparatus according to the present invention is an optical disk apparatus capable of reading data from an optical disk which has a plurality of information recording layers, including a first information recording layer whose distance from a disk surface is relatively small and a second information recording layer whose distance from the disk surface is relatively large, comprising: a light source for radiating a light beam; a lens for converging the light beam radiated from the light source; focus control means for causing a converging point of the light beam to be positioned on an arbitrary information recording layer of the optical disk; tracking control means for causing the converging point of the light beam to be positioned on a predetermined track of the information recording layer; means for generating a readout signal from the light beam having been reflected from the information recording layer; and a PLL circuit for generating a reference timing signal based on the readout signal, wherein the gain setting means prescribes a gain of the PLL circuit when generating the reference timing signal from the first information recording layer to be a value which is higher than a gain of the PLL circuit when generating the reference timing signal from the second information recording layer.

In a preferred embodiment, when making a move of the converging point of the light beam from a current information recording layer to another target information recording layer, the high-frequency gain is changed, after the move of the converging point, from a value for the current information recording layer to a value for the other target information recording layer.

In a preferred embodiment, a distance between the disk surface and the second information recording layer is 100 μm or less.

In a preferred embodiment, the gain setting means stores a parameter defining gain characteristics for the plurality of information recording layers.

In a preferred embodiment, in accordance with each mounted optical disk, the gain setting means updates an initial value of the parameter to a new setting value.

EFFECTS OF THE INVENTION

According to the present invention, even in the case where scratches or dust particles exist on the surface of an optical disk having a plurality of information recording layers, the transient responses of various signals are reduced by adjusting the gain crossover frequency(s) of a control loop(s), thus preventing the control loop(s) from failing, and avoiding amplitude losses of the RF signal. Thus, a highly reliable optical disk apparatus which supports a multi-layered disk can be provided while ensuring readout signal quality.

BRIEF DESCRIPTION OF DRAWINGS

FIG. 5 A graph showing relationships between defocus and disk tilts and the readout signal quality, with respect to information recording layers: an L0 layer and an L1 layer.

Figure 1:
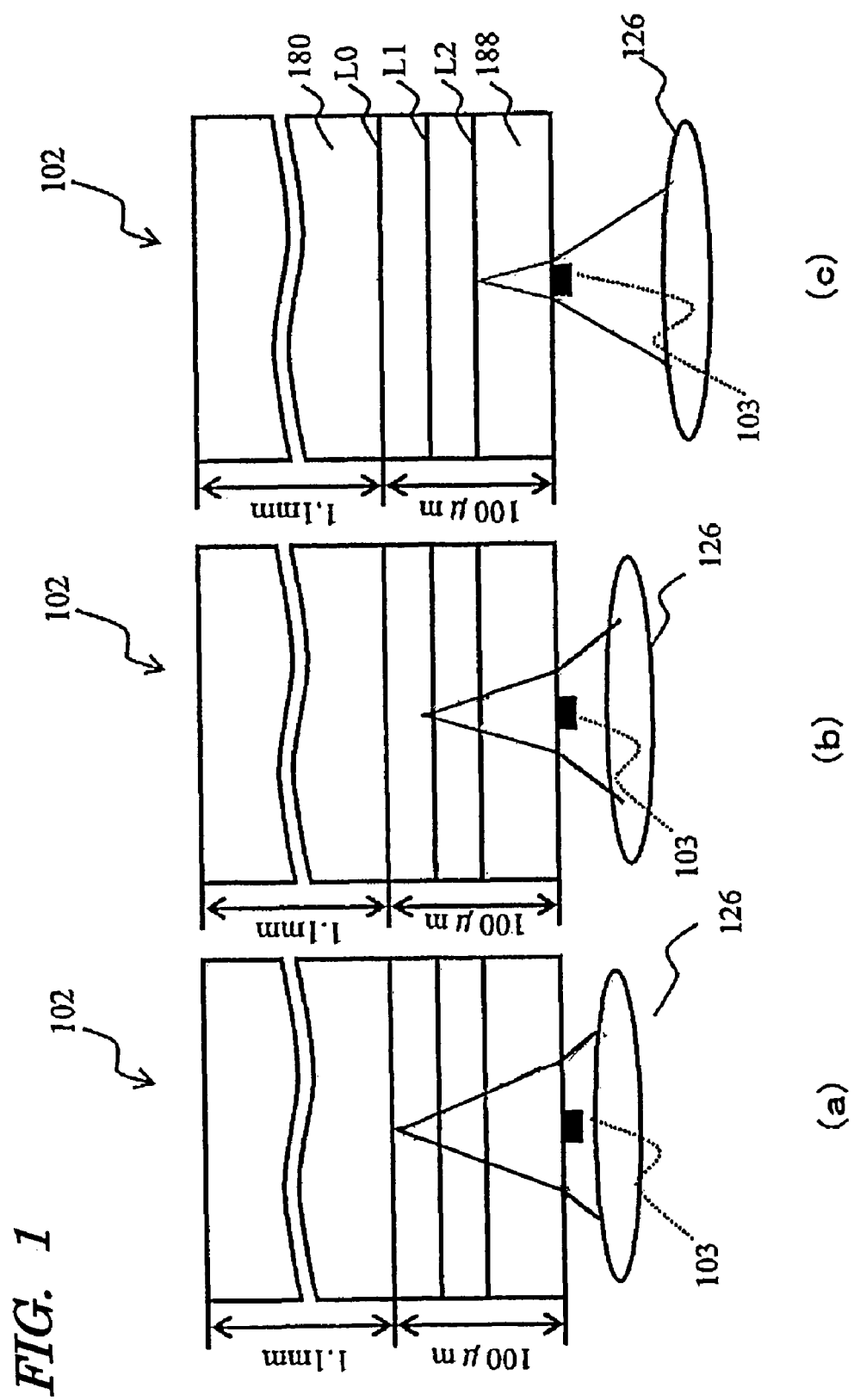
FIG. 1 (*a*), (*b*) and (*c*) show a cross-sectional structure of an optical disk 102 having a scratch 103 on its surface, as well as relative positions of a light beam and its converging point.

DESCRIPTION OF THE REFERENCE NUMERALS 100 optical disk apparatus
102 optical disk
104 controller
110 optical head
112 moving section
114 focus detection section
115 tracking detection section
116 RF addition section
117 focus control section
118 tracking control section
119 equalizer section
120 reproduction section

BEST MODE FOR CARRYING OUT THE INVENTION

Prior to describing embodiments of the present invention, the relationship between the depths of information recording layers and scratches on a disk surface will be described.

First, (a) to (c) of FIG. 1 are referred to. In FIG. 1, (a) to (c) show a cross-sectional structure of an optical disk 102, as well as relative positions of a light beam and its converging point. The illustrated optical disk (thickness: 1.2 mm) 102 includes: a substrate (thickness: 1.1 mm) 180; information recording layers L0, L1 and L2, which are supported by the substrate 180; and a protective film 188, which covers the information recording layer L2. A thin transparent layer is interposed between the information recording layers L0 and L1, and also between the information recording layers L1 and L2. In FIG. 1, (a), (b) and (c) respectively show states in which the focal point of the light beam is positioned on the information recording layers L0, L1 and L2.

Within a thickness range of 100 µm, the three layers of information recording layers L0 to L2 are stacked at an interval of 25 µm. In other words, the information recording layers L0, L1 and L2 are disposed at the depths of 100 µm, 75 µm, and 50 µm, respectively, from the surface (disk surface) of the protective film (thickness: about 50 µm) 188. The protective film 188 is composed of a transparent material so as to allow a light beam which has been converged by a converging lens 126 to be transmitted therethrough, and thus the respective information recording layers L0 to L2 are optically accessed via the protective film 188. The selection as to which information recording layer among the three layers of information recording layers L0 to L2 is to be accessed may be made by adjusting the position of the converging lens 126 along the optical axis direction (i.e., a direction perpendicular to the disk surface), and allowing the converging point (focal point) of the light beam to be positioned on the target information recording layer which is to be accessed.

In the state of FIG. 1(a), the area of a light beam cross section which is formed by the disk surface traversing the light beam is relatively large, so that the scratch 103 accounts for a small areal proportion within that area. On the other hand, in the state shown in FIG. 1(c), the area of a light beam cross section which is formed by the disk surface traversing the light beam is relatively small, so that the scratch 103 accounts for a large a real proportion within that area. Thus, depending on which information recording layer among the information recording layers L0, L1 and L2 the focal point of the light beam is located on, the scratch 103 which is formed on the surface of the optical disk 102 exerts a different influence.

Figure 2:
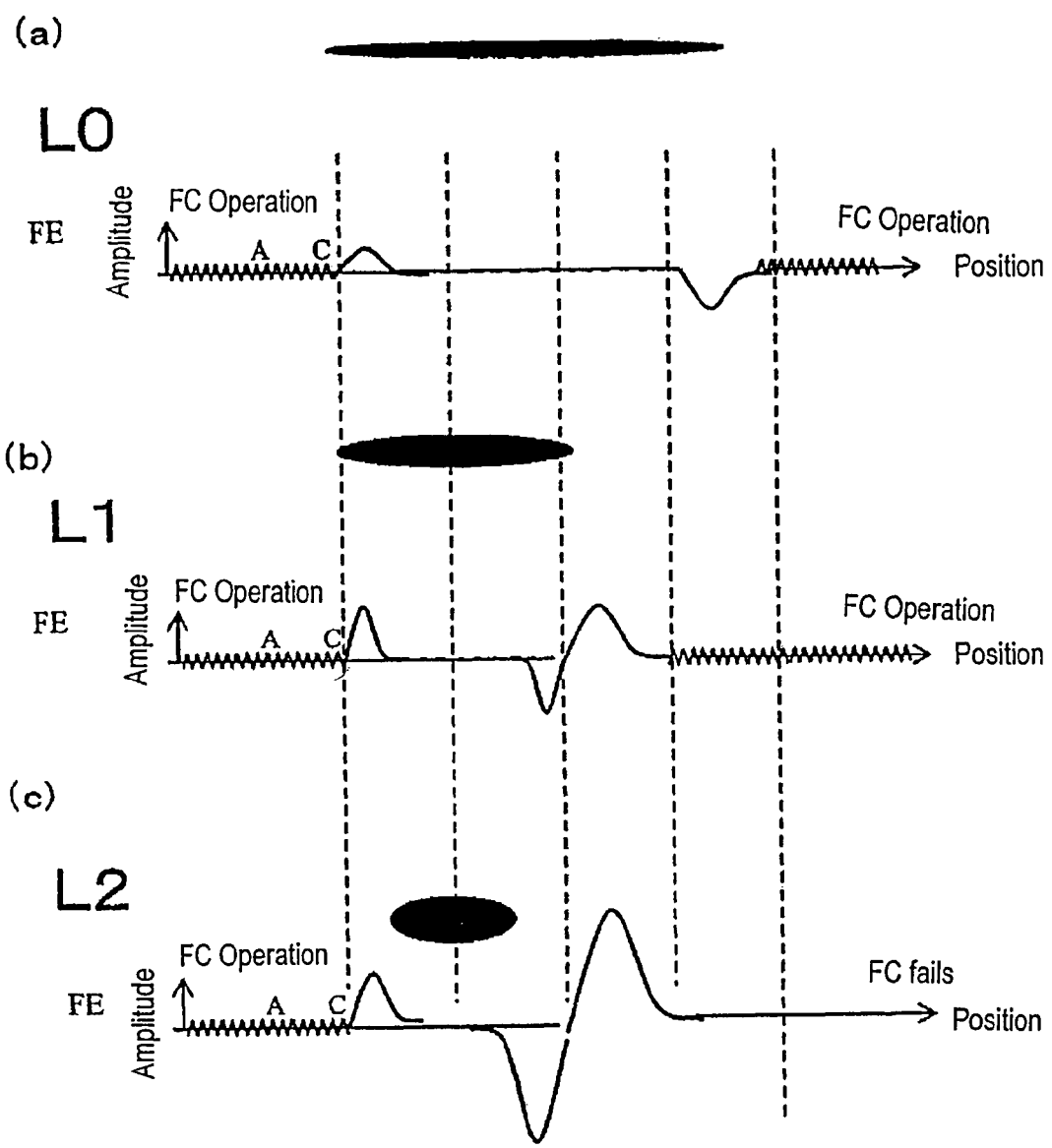
FIG. 2 (*a*), (*b*) and (*c*) schematically show relationships between an FE signal which is obtained when focus control is performed in the states shown in (*a*), (*b*) and (*c*) of FIG. 1, respectively, and a scratch on the disk surface.

In FIG. 2, (a), (b) and (c) schematically show relationships between an FE signal which is obtained when focus control is performed in the states shown in (a), (b) and (c) of FIG. 1, respectively, and a scratch. It is assumed that, as in the conventional case, the gain of focus control is prescribed at the same magnitude in all of these cases.

When the focal point of the light beam is positioned on the information recording layer L0, the amount of time during which the scratch 103 shown in FIG. 1(a) traverses the light beam becomes relatively long. FIG. 2(a) illustrates there being a long period during which a proper FE signal cannot be obtained due to the influence of the scratch 103. A black mark shown in the upper portion of FIG. 2(a) schematically represents the magnitude of the influence caused by a scratch on the disk surface and a period during which such influence occurs. During this period, defocusing (i.e., a phenomenon where the converging point of the light beam goes off the target information recording layer) is caused by the scratch 103, so that the FE signal temporarily becomes weak, substantially to zero.

In FIG. 2, "FC operation" indicates a focus control being performed, where the FE signal is vibrating with a small amplitude. For example, at time A, the converging point of the light beam is located on the information recording layer L0 because of focus control being performed. Since the optical disk is rotating, the optical disk will have axial runout; however, through focus control, the converging lens 126 of FIG. 1(a) will follow along the axial runout of the optical disk, and therefore the converging point of the light beam can always be retained on the information recording layer L0. However, since the converging point of the light beam is slightly deviated from the information recording layer L0, the FE signal will slightly vibrate even during the FC operation, as shown in FIG. 2(a).

At time C, the light beam begins to travel across the scratch on the disk surface, so that a proper FE signal can no longer be generated. When the light beam is about to travel across the scratch on the disk surface, an accurate FE signal will not be generated, and thus the converging point of the light beam may largely deviate from the information recording layer L0.

Once the light beam finishes traveling across the scratch on the disk surface, it becomes possible to generate a proper FE signal, and thus an FC operation can be begun again. At this time, an FE signal having a magnitude which is in accordance with the offset between the positions of the converging point of the light beam and the information recording layer L0 is generated, and the position of the converging lens 126 is controlled so as to reduce this FE signal to zero. Although the FE signal undergoes a large change in amplitude, through focus control, the converging point of the light beam is able to be positioned on the information recording layer L0.

As described earlier, when the information recording layer L0 is being accessed, the scratch 103 accounts for a small areal proportion in the cross-sectional area of the light beam, so that the influence of the scratch 103 is relatively small. The black mark shown in the upper portion of FIG. 2(a) has a relatively narrow width, indicative of a small influence of the scratch. Since the influence of the scratch is small, as shown in FIG. 2(a), the fluctuations (flutter) of the FE signal before and after the light beam travels through the scratch 103 are small.

On the other hand, in the state of FIG. 1(b), the amount of time for which the light beam travels through the scratch is reduced, so that the period during which defocusing is caused by the scratch 103 is shorter. In the state of FIG. 1(c), the amount of time for which the light beam travels through the scratch is further reduced, and the period during which defocusing is caused by the scratch 103 is even shorter. Therefore, in the states of FIG. 1(b) and (c), as shown in FIG. 2(b) and (c), the fluctuations (flutter) of the FE signal before and after the light beam travels through the scratch 103 are large.

Thus, in the case where the gain of focus control is prescribed at a constant value, the FE signal becomes more disturbed before and after traveling through the scratch 103 as the position of the information recording layer which is the target of recording/reproduction becomes shallower, as shown in FIG. 2(a) to (c). In particular, in the example shown in FIG. 2(c), the fluctuations in the FE signal may become excessively large immediately after the light beam has traveled through the scratch 103, such that focus control may fail.

Next, with reference to FIG. 3 and FIG. 4, the gain characteristics of a focus control loop will be described.

Figure 3:
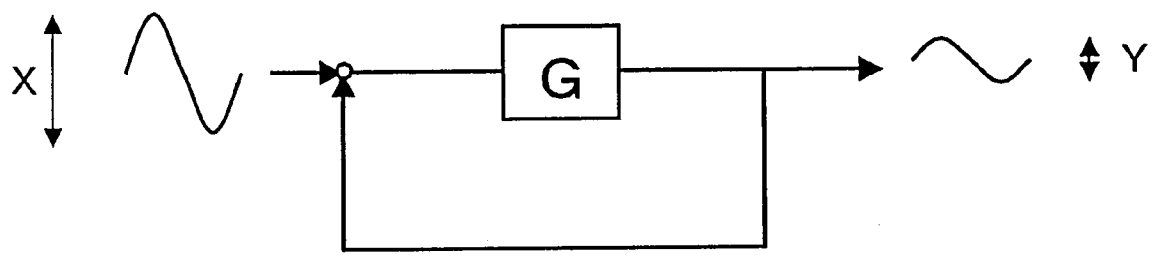
FIG. 3 A diagram schematically showing a manner in which the amplitude of an FE signal which is supplied to a servo control system (corresponding to the magnitude of a disturbance such as axial runout) is reduced by servo control.

FIG. 3 is a diagram schematically showing a manner in which the amplitude of an FE signal which is supplied to a focus control system (corresponding to the magnitude of a disturbance such as axial runout) is reduced by servo control. Assuming that the FE signal which is input to a servo control system has an amplitude "X", the amplitude is reduced to "Y" through focus control (X>Y). Herein, the gain of servo control can be represented as a ratio of Y to X (i.e., Y/X). For example, when Y/X=1/1000, the gain is 60 dB. When there exists an axial runout of 300 µm, if a focus control with a gain of 60 dB is performed, the amplitude of the FE signal will be reduced to an amplitude corresponding to 0.3 µm. In other words, the deviation between the converging point of the light beam and the target information recording layer will be retained within a range of 0.3 µm or less. However, the actual gain has frequency dependence, and therefore is not so simple as above.

Figure 4:
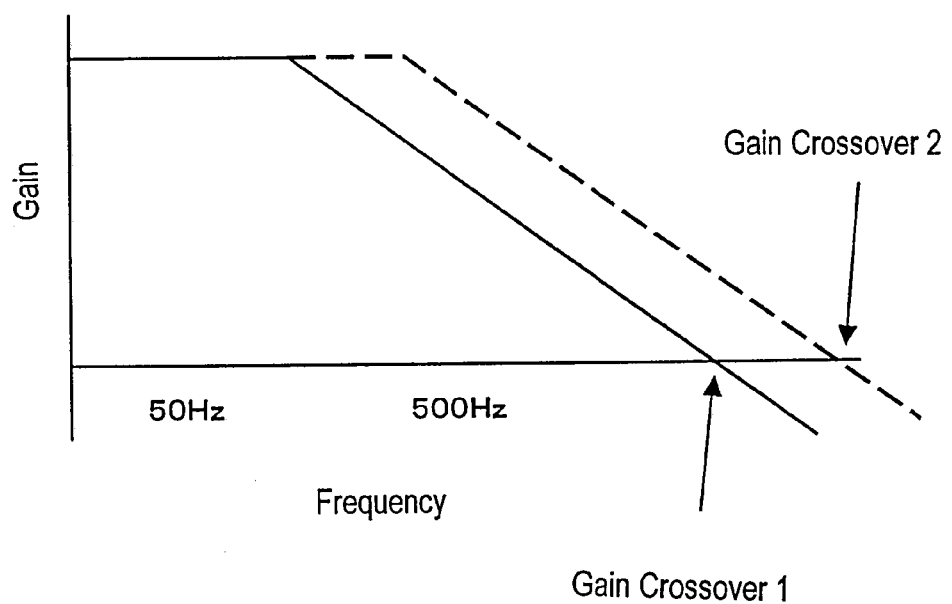
FIG. 4 A graph schematically showing the gain characteristics of focus control in an optical disk apparatus.

FIG. 4 is a graph schematically showing the gain characteristics of a focus control loop in an optical disk apparatus. Since the gain has frequency dependence, even if the gain at a frequency of 50 Hz is 60 dB, for example, the gain will decrease as the frequency increases. In the present specification, a frequency at which the gain equals zero will be referred to as a "gain crossover frequency".

In the focus control of an optical disk apparatus, the gain characteristics of the servo loop can be defined based on the gain crossover frequency. FIG. 4 shows the outlines of two kinds of gain characteristics. According to the gain characteristics shown by a broken line, the gain in the higher frequency region is high as compared to the gain characteristics shown by a solid line. Since the servo control of an actual optical disk apparatus will exhibit the gain characteristics as shown in FIG. 4, the outline of the gain characteristics can be determined by merely specifying the gain crossover frequency, instead of describing the exact gain at each frequency.

In the example of FIG. 4, it is assumed that a gain crossover 1 in the case of the gain characteristics of the solid line has a frequency of 2 kHz, and that a gain crossover 2 in the case of the gain characteristics of the broken line has a frequency of 3 kHz. If the gain crossover frequency is reduced from 3 kHz to 2 kHz, the gain will decrease in a relatively broad range of frequencies.

Thus, since the gain has frequency dependence, even if the gain at a frequency of 50 Hz is 60 dB, for example, the gain at a frequency of 500 Hz will decrease to 20 dB. In this case, if the FE signal greatly vibrates due to disturbances such as the axial runout of the optical disk, the amplitude after servo control will be reduced to about 0.3 µm, assuming that the FE signal initially has an amplitude of 300 µm at a frequency of 50 Hz. However, with respect to the still higher frequency components contained in the FE signal, the gain will be relatively small, and therefore the reduction rate of the disturbance amplitude will be lower. The size of the signal amplitude after having been lowered through servo control may be referred to as a "control residue". In the aforementioned case where there is a disturbance with an amplitude of 300 µm at 50 Hz, it has been found that the control residue at a frequency of 50 Hz is 0.3 µm. Even under focus servo control, the control residue cannot be zeroed, and the FE signal will continue vibrating with a certain amplitude.

As will be clear from the above explanation, when the gain crossover frequency is decreased, the overall gain will decrease. If the FE signal has large fluctuations due to a scratch on the disk surface, there is a problem in that, as shown in FIG. 2(c), focus control may fail as described above. In order to solve this problem, it would be effective to suppress the response of focus control. Suppression of the response of focus control can be made by reducing the gain of the control loop. However, reducing this gain will result in an increase in the control residue of focus control, so that the offset between the positions of the converging point of the light beam and the information recording layer will increase on average. This may possibly result in a deterioration in the quality of the readout signal.

FIG. 5 is a graph showing relationships between defocus and disk tilts and the readout signal quality, with respect to information recording layers, an L0 layer and an L1 layer, which are at different depths. Herein, the readout signal quality is represented as "MLSE". MLSE is an index which defines a distribution of likelihood of compensation after a waveform equalization under PRML (Partial Response Maximum Likelihood) signal processing, and can be used as a signal quality index, similarly to jitter. Details of MLSE are disclosed in, for example, Harumitsu Miyashita, et. al., "Signal Qualification Method for Partial-Response Maximum-Likelihood Read/Write Channel" (Japanese Journal of Applied Physics Vol. 43, No. 7B, 2004, pp. 4850-4851); and the entirety of this document is incorporated in the present specification. Note that disk tilts are evaluated with respect to the following two: radial tilt (R-tilt) and tangential tilt (T-tilt).

As shown in FIG. 5, in a comparison between the margins of the respective parameters concerning the information recording layer L0 and the information recording layer L1 layer, the defocus margin is at ±0.2 µm for both, whereas the tilt margins (i.e., the radial tilt margin and tangential tilt margin) show larger margins for the information recording layer L1.

Generally speaking, a tilt margin increases as coma aberration decreases. Assuming that the information recording layer has a depth d; the lens has a numerical aperture NA; and the light beam has a wavelength λ, the magnitude of the coma aberration is expressed as $d \times NA^3/\lambda$. Therefore, in a Blu-ray disk drive, which employs a lens with a large NA, the difference in tilt margin due to differences in the depths of the information recording layers L0 and L1 will be more prominent.

The transient response of focus control caused by a scratch on the disk surface will become more intense as the position of the information recording layer becomes closer to the disk surface, as shown in FIG. 2(a) to (c). On the other hand, the tilt margins will increase as the position of the information recording layer becomes closer to the disk surface, as shown in FIG. 5. This tendency is clear in the case where an information recording layer exists in a position near the disk surface (at a depth 100 μm or less from the disk surface), as in the case of a BD.

According to the present invention, by paying attention to the aforementioned phenomenon, the loop gain of servo control is changed with respect to each information recording layer in order to obtain a milder transient response to a scratch on the disk surface. Specifically, as the position of the information recording layer becomes closer to the disk surface, the gain crossover frequency is prescribed to be a relatively lower value so that the gain will decrease. By thus prescribing a lower gain with respect to a shallower information recording layer, the residue in following the axial runout of the optical disk, etc., will increase; however, the rate of occurrence of read errors will not increase because a shallow information recording layer has relatively large tilt margins. Therefore, it is preferable that the gain crossover frequency setting value for each information recording layer is determined to be a value corresponding to the amount of increase in the tilt margins.

Embodiment 1

Next, with reference to FIG. 6 and FIG. 7, a first embodiment of the optical disk apparatus according to the present invention will be described.

First, the functional blocks of an optical disk apparatus 100 according to the present embodiment will be described with reference to FIG. 6, followed by specific descriptions of the structure.

Figure 6:
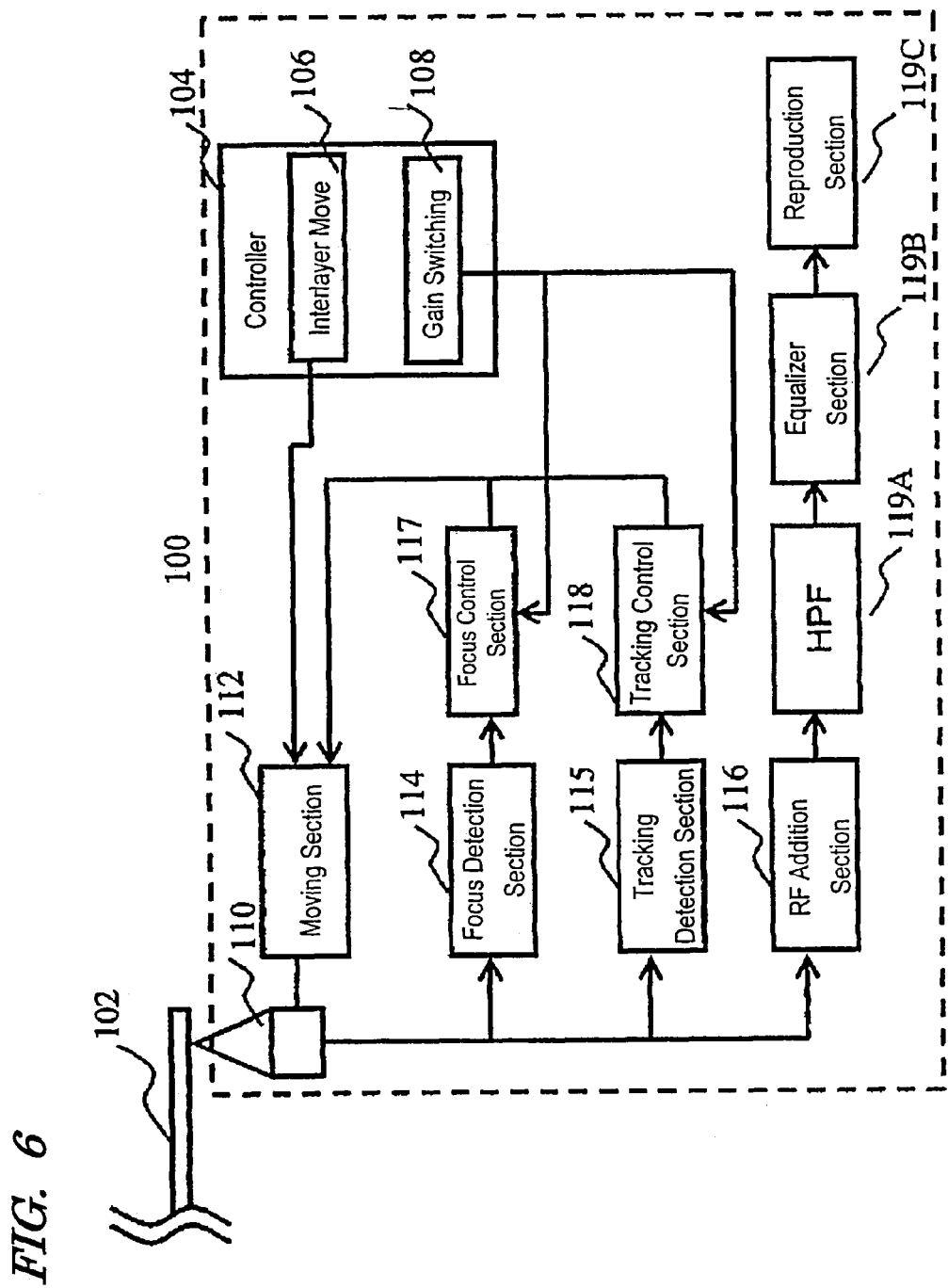
FIG. 6 A diagram showing the functional blocks of an optical disk apparatus according to Embodiment 1 of the present invention.

As shown in FIG. 6, the optical disk apparatus 100 includes an optical head 110 which optically accesses a desired information recording layer of an optical disk 102. The optical disk 102 has a plurality of information recording layers as shown in FIG. 1, for example. The optical head 110 converges a light beam on an arbitrary information recording layer of the optical disk 102, and converts the light which has been reflected from the information recording layer into an electrical signal. For example, the optical head 110 includes a light source such as a semiconductor laser and a lens (objective lens) for converging a light beam which is radiated from the light source. The optical head 110 may include a plurality of light sources for radiating light beams of different wavelengths, and a plurality of objective lenses each of which converges a light beam of a specific wavelength. In that case, an appropriate light source and an appropriate objective lens are to be selected in accordance with the type of the optical disk which is mounted on the optical disk apparatus.

Note that, in order to read data from or write data to an information recording layer of a DVD, it is necessary to converge red laser (wavelength: 660 nm), and control it so that its focal point is positioned on the information recording layer. An objective lens which is used for converging laser light in this case has a numerical aperture (NA) of about 0.6. On the other hand, in order to read data from an information recording layer of a BD, it is necessary to converge blue/violet laser (wavelength: 405 nm), and control it so that its focal point is positioned on the information recording layer. An objective lens which is used for converging laser light in this case has a numerical aperture (NA) of 0.85.

A moving section 112 includes an actuator for adjusting the position of the aforementioned objective lens. This actuator is able to not only move the objective lens along a direction perpendicular to an information recording layer of the optical disk 102, but also move the objective lens in parallel to an information recording layer. Through the movement of the objective lens, the converging point of the light beam is moved, and thus data can be written to an arbitrary track on an arbitrary information recording layer of the optical disk, or data can be read from that track.

Based on the electrical signal which is output from the optical head 110, a focus detection section 114 generates an FE signal which represents an offset between the positions of the converging point of the light beam and the target information recording layer. A focus control section 117 performs filtering calculations for the FE signal which is received from the focus detection section 114, and supplies a driving signal to the moving section 112. During focus control, the moving section 112 controls the position (within the optical head 110) of the objective lens along the optical axis direction, based on the driving signal received from the focus detection section 114, thus ensuring that the converging point of the light beam is positioned on an information recording layer of the optical disk.

When the target of an optical access by the optical head 110 changes from one information recording layer to another information recording layer, it is necessary to move the converging point of the light beam between information recording layers, along the vertical direction. Such a movement of the converging point of the light beam between information recording layers may be referred to as an "interlayer move" or "focus jump" in the present specification.

The focus control section 117 turns off the focus control before any "interlayer move" is made. A controller 104 drives the moving section 112 so as to change the position of the objective lens greatly along the optical axis direction, thus moving the converging point of the light beam to another information recording layer. After the "interlayer move" is completed, the focus control section 117 turns on the focus control.

Based on the electrical signal which is output from the optical head 110, a tracking detection section 115 generates a tracking error signal (TE signal). A tracking control section 118 performs filtering calculations for the TE signal, and drives the moving section 112. In accordance with the signal from the tracking control section 118, the moving section 112 performs tracking control so that the converging point of the light beam is positioned on a desired track on the optical disk 102.

An RF addition section 116 subjects the signal from the optical head 110 to additions, thus generating an RF signal. A high-pass filter (HPF) 119A removes a low-frequency component from the RF signal, and ensures a necessary RF amplitude. An equalizer section 119B amplifies a signal component of the output from the HPF 119A that falls within a predetermined frequency band, and attenuates the signal components in the unwanted bands. A reproduction section 119C binarizes the output from the equalizer section 119B, and thereafter subjects it to digital signal processing such as error correction and demodulation. Thus, the data which is recorded on the optical disk 102 can be reproduced.

The controller 104 controls the moving section 112 so as to move the converging point of the light beam among the plurality of information recording layers of the optical disk 102 (interlayer move). A feature of the present embodiment is in that the gain in the focus control section 117 is switched. Specifically, in the present embodiment, the loop gain of focus control is changed in such a manner that the gain crossover frequency decreases as the information recording layer on which the converging point of the light beam is to be positioned becomes closer to the disk surface (light-incident surface). When decreasing the gain crossover frequency, it is preferable to adjust the value of the gain crossover frequency so as to decrease the gain at 500 Hz to 5 kHz by 3 dB or more, in order to obtain the effects of the present embodiment.

Next, with reference to FIG. 7, the more specific structure of the optical disk apparatus 100 will be described.

As component elements of the optical head, the illustrated optical disk apparatus includes: a light source 122; a coupling lens 123; a focus actuator 124; an objective lens 126; a tracking actuator 128; a polarization beam splitter 130; a converging lens 132; an optical detector 134; preamplifiers 136, 138, 140 and 142; and adders 144 and 146.

The light source 122 is a semiconductor laser which radiates a light beam. Although FIG. 7 illustrates only one light source 122 for simplicity, the actual light source may be composed of e.g. three semiconductor laser chips which radiate laser light of different wavelengths. The coupling lens 123 collimates the light beam radiated from the light source 122 into parallel light. The polarization beam splitter 130 reflects the parallel light from the coupling lens 123 toward where the optical disk 102 is located. The light which has been reflected from the polarization beam splitter 130 will be transmitted through the objective lens 126 so as to be incident on the optical disk 102.

The focus actuator 124 changes the position of the objective lens 126 in a direction substantially perpendicular to the information recording layers of the optical disk 102, and the tracking actuator 128 changes the position of the objective lens 126 in a direction substantially parallel to the information recording layers of the optical disk 102.

The objective lens 126 converges the light beam reflected from the polarization beam splitter 130, and causes the focal point to be positioned on an information recording layer of the optical disk 102. At this time, a light beam spot is formed on the information recording layer. The laser light which has been reflected from the optical disk 102 travels through the objective lens 126 and the polarization beam splitter 130.

The converging lens 132 converges the reflected light from the optical disk 102, which has traveled through the objective lens 126 and the polarization beam splitter 130, onto the optical detector 134. The optical detector 134 receives the light which has traveled through the converging lens 132, and converts this optical signal into an electrical signal (electric current signal). The optical detector 134 has four-split light-receiving regions, for example. In the example shown in FIG. 7, four kinds of electrical signals which are output from the optical detector 134 are input to the adders 144 and 146, via the preamplifiers 136, 138, 140 and 142.

Figure 7:
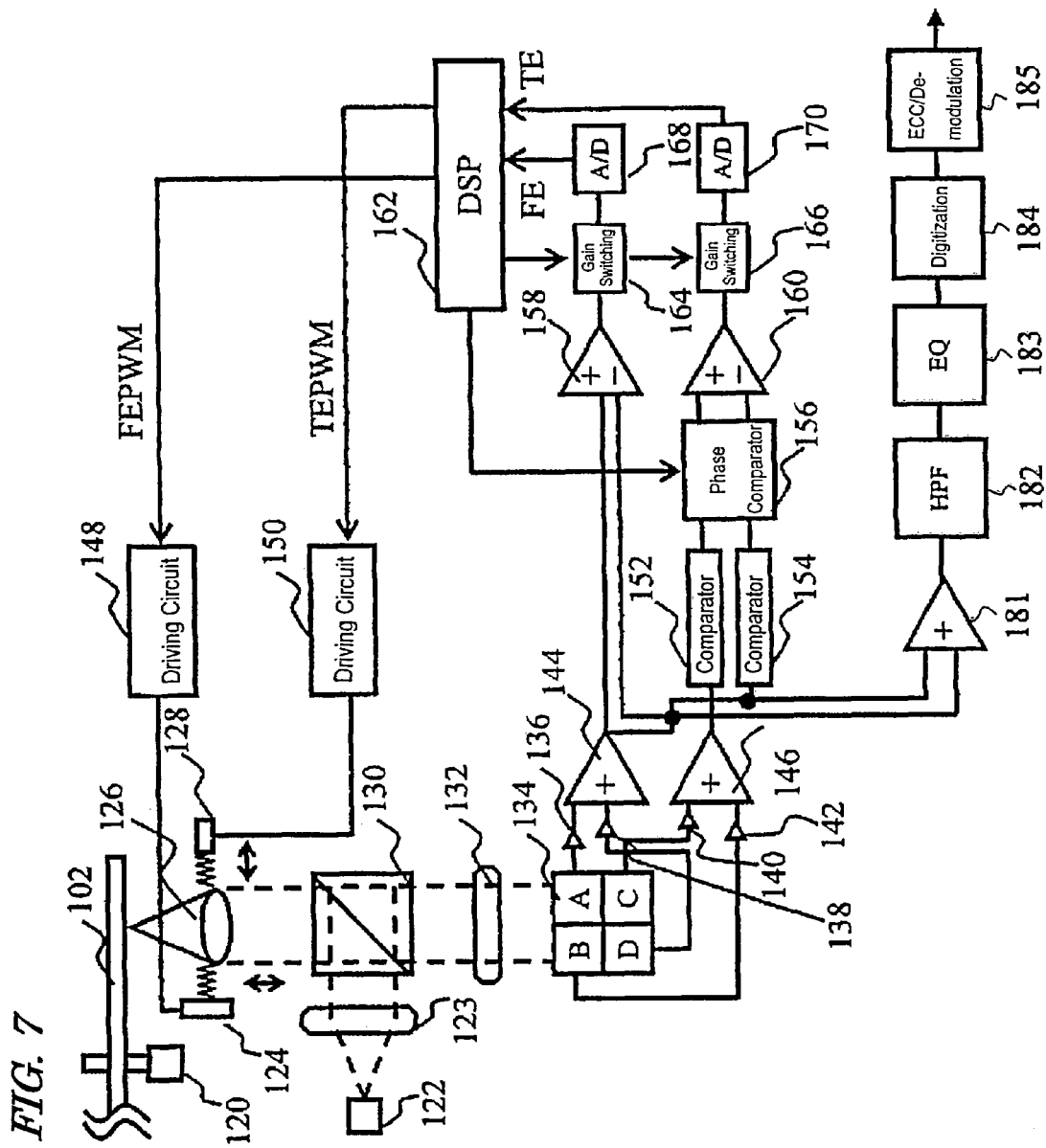
FIG. 7 A diagram showing the structure of an optical disk apparatus according to an embodiment of the present invention.

The optical disk apparatus of FIG. 7 further includes comparators 152 and 154, a phase comparator 156, differential amplifiers 158 and 160, a digital signal processor (DSP) 162, gain switching circuits 164 and 166, and analog-digital (AD) converters 168 and 170.

The differential amplifier 158 receives the outputs from the adders 144 and 146, and outputs a focus error signal (FE signal). The FE signal is a signal for controlling the light beam so as to have a predetermined convergence state on an information recording layer of the optical disk 102. There are no particular limitations as to the detection method for the FE signal. An astigmatic technique may be employed; a knife edge technique may be employed; or an SSD (spot sized detection) technique may be employed. Depending on the detection method, the circuit construction may be changed as necessary.

The comparators 152 and 154 binarize the signals from the addition circuits 144 and 146, respectively. The phase comparator 156 performs a phase comparison for the signals which are output from the comparators 152 and 154.

The differential amplifier 160 receives the output from the phase comparator 156, and outputs a tracking error signal (TE signal). The TE signal is a signal for controlling the light beam to properly scan over a track of the optical disk 102. There are no particular limitations as to the detection method for the TE signal, and it is not necessary to employ a phase difference technique. A push-pull technique may be employed, or a three beam method may be employed. Depending on the detection method, the circuit construction may be changed as necessary.

The DSP 162, which corresponds to the controller 104 in FIG. 6, outputs a control signal for tracking control to the driving circuit 150, in accordance with the TE signal and the like. Moreover, the DSP 162 outputs a control signal for focus control to the driving circuit 148, in accordance with the FE signal and the like. The driving circuit 150 drives the tracking actuator 128 in accordance with the control signal from the DSP 162. The tracking actuator 128 moves the converging lens 126 along a direction which is substantially parallel to the information recording layers of the optical disk 102. The driving circuit 148 drives the focus actuator 124 in accordance with the control signal from the DSP 162. The focus actuator 124 moves the converging lens 126 along a direction which is substantially perpendicular to the information recording layers of the optical disk 102.

The gain switching circuit 164 adjusts the gain of focus control so that the FE signal has a predetermined amplitude. The AD converter 168 converts the signal from the gain switching circuit 164 into a digital signal, and outputs it to the DSP 162. On the other hand, the gain switching circuit 166 adjusts the gain of tracking control so that the TE signal has a predetermined amplitude. The AD converter 170 converts the signal from the gain switching circuit 166 into a digital signal, and outputs it to the DSP 162.

The output from the optical detector 134 is also input to the RF addition circuit 181. The RF addition circuit 181 adds the outputs from the addition circuits 144 and 146, while maintaining their frequency bands. The RF signal is a signal which corresponds to local changes in the reflectance of an information recording layer of the optical disk 102, and is used for reproducing address information or user data. The output from the RF addition circuit travels through a high-pass filter (HPF) 182, which compensates its amplitude for lowering of the reflectance of the recording medium 102, or scratches, dust particles, or soil on the surface, and is input to the equalizer (EQ) 183. The EQ 183 is a higher-order filter, which is composed of e.g. an equiripple filter, for extracting any valid signal contained in the RF signal. The EQ 183 emphasizes the necessary frequency band, and attenuates and removes unwanted high frequencies. The RF signal of the valid band having been extracted by the EQ 183 is digitized by a binarization circuit 184 which constitutes the reproduction section 119C shown in FIG. 6, and is output via an ECC/demodulation circuit 185.

A disk motor 120 rotates the optical disk 102 at predetermined revolutions.

In the present embodiment, the optical detector 134, the preamplifiers 136, 138, 140 and 142, the addition circuits 144 and 146, the comparators 152 and 154, the phase comparator 156, the differential amplifier 160, the gain switching circuit 166, the AD converter 170, the DSP 162, the driving circuit 150, and the tracking actuator 128 together constitute the tracking control means which is recited in the claims. On the other hand, the optical detector 134, the preamplifiers 136 to 142, the addition circuits 144 and 146, the differential amplifier 158, the gain switching circuit 164, the AD converter 168, the DSP 162, the driving circuit 148, and the focus actuator 124 together constitute the focus control means which is recited in the claims.

Next, the basic operations of the optical disk apparatus of the present embodiment will be described.

First, suppose that an interlayer move to the information recording layer L1 is required while the information recording layer L0 is being accessed. In this case, by the action of the DSP 162 and the driving circuit 148, the converging point of the light beam is moved from the information recording layer L0 to the information recording layer L1. In the present embodiment, the gain switching circuit 164 is controlled so that the gain crossover frequency after moving to the information recording layer L1 equals a value GF1. Then, after the converging point of the light beam has reached the information recording layer L1, the servo loops of focus control and tracking control are closed. Herein, the gain crossover frequency GF1 has a lower value than a gain crossover frequency GF0 for the information recording layer L0.

Furthermore, when an interlayer move from the information recording layer L1 to the information recording layer L2 is required, the converging point of the light beam is moved from the information recording layer L1 to the foremost information recording layer L2, by the action of the DSP 162 and the driving circuit 148. In this case, too, according to the present embodiment, the gain switching circuit 164 is controlled so that the gain crossover frequency after moving to the information recording layer L2 equals a value GF2. Then, after the converging point of the light beam has reached the information recording layer L2, the servo loops of focus control and tracking control are closed.

Thus, the gain crossover frequency values for the information recording layers L0, L1 and L2 according to the present embodiment satisfy the relationship GF0>GF1>GF2. Parameters which define the gain setting values or gain characteristics are previously stored as table values in a memory (not shown) which is internalized in the DSP 162.

Note that, in the present embodiment, switching of the various parameters defining the gains is made before an interlayer move. It is preferable to perform switching of the gains of focus servo and tracking servo before the actual interlayer move is begun because it will not cause instability even if performed before an interlayer move. The reason is that, in a stable state where focus servo and tracking servo are in operation, even if the gain is switched before an interlayer move, servo will not fail because of its influence. Conversely, when the reflectances of the information recording layers or the modulation factors for the tracking signal vary among the information recording layers, proper gain characteristics will not be obtained after an interlayer move, thus making it difficult to close the servo loops. Therefore, in order to obtain the effects of gain switching promptly after an interlayer move, it is desirable to perform gain switching immediately before beginning the interlayer move.

Note that the gain characteristics, which differ from information recording layer to information recording layer, are preferably optimized in accordance with the differences pertaining to each optical disk. Hereinafter, a method for adjusting the gain characteristics through a learning which is performed at booting will be briefly described.

First, when the optical disk apparatus is powered on, the focus actuator 124 operates so as to make a focal point on the information recording layer L0, which is the farthest from the objective lens 126 among the information recording layers of the optical disk 102 that is mounted on the optical disk apparatus. At this time, the gain switching circuit 164 is adjusted so that the gain crossover frequency of focus control equals the value GF0, and the gain characteristics of focus servo are modified from an initial value.

Next, by the action of the DSP 162 and the driving circuit 148, the converging point of the light beam is moved from the information recording layer L0 to the information recording layer L1. After the converging point of the light beam has moved to the information recording layer L1, the servo loop of tracking control is closed, and the gain switching circuit 164 is controlled so that the gain crossover frequency equals the value GF1. Once the gain adjustment for the information recording layer L1 is completed, the converging point of the light beam is moved from the information recording layer L1 to the foremost information recording layer L2 by the action of the DSP 162 and the driving circuit 148. At this time, it is preferable to adopt the value which has been adjusted for the information recording layer L1 as an initial gain of focus control. After the converging point of the light beam has moved to the information recording layer L2, the servo loop of tracking control is closed, and the gain switching circuit 164 is controlled so that the gain crossover frequency equals the value GF2. This gain crossover frequency GF2 is a lower value than the gain crossover frequency GF1 for the information recording layer L1. Parameters which define the gains after adjustments are stored as table values in a memory (not shown) which is internalized in the DSP 162.

Depending on the variations in the sensitivity characteristics of the focus actuator 124, large gain fluctuations may initially exist. Therefore, during the process adjustments before shipment, it is preferable to employ a stable optical disk which is free of axial runout or eccentricity to obtain adjustment values which can absorb such sensitivity variations, and write the adjustment values to a non-volatile memory in the optical disk apparatus.

Since the reflectance of each information recording layer of the optical disk also fluctuates from optical disk to optical disk, it is preferable to adjust the parameters defining the gains in response to reflectance fluctuations. Such adjustments of gain parameters are preferably performed at booting of the optical disk apparatus, as described above.

Although the gain of focus control is adjusted with respect to each information recording layer in the present embodiment, the gain of tracking control may be adjusted with respect to each information recording layer. The relationship between the gain of tracking control, response characteristics of the TE signal associated with scratches on the disk surface, and tilt margins is also similar to that in the case of focus control.

In accordance with the optical disk apparatus of the present embodiment, even though scratches may exist on the surface of a multi-layered disk which has a plurality of stacked information recording layers, it is possible to reconcile control stability of the optical disk apparatus with high quality recording/reproduction, thus being able to provide a highly reliable apparatus.

Embodiment 2

Next, a second embodiment of the optical disk apparatus according to the present invention will be described. The optical disk apparatus of the present embodiment has the basic structure as shown in FIG. 7. The optical disk apparatus of the present embodiment differs from the optical disk apparatus of Embodiment 1 described above in that the frequency characteristics of the EQ 183 are changed depending on the depth of each information recording layer which the optical disk 102 has.

Hereinafter, the gain setting for the HPF 182 according to the present embodiment will be described.

Figure 8:
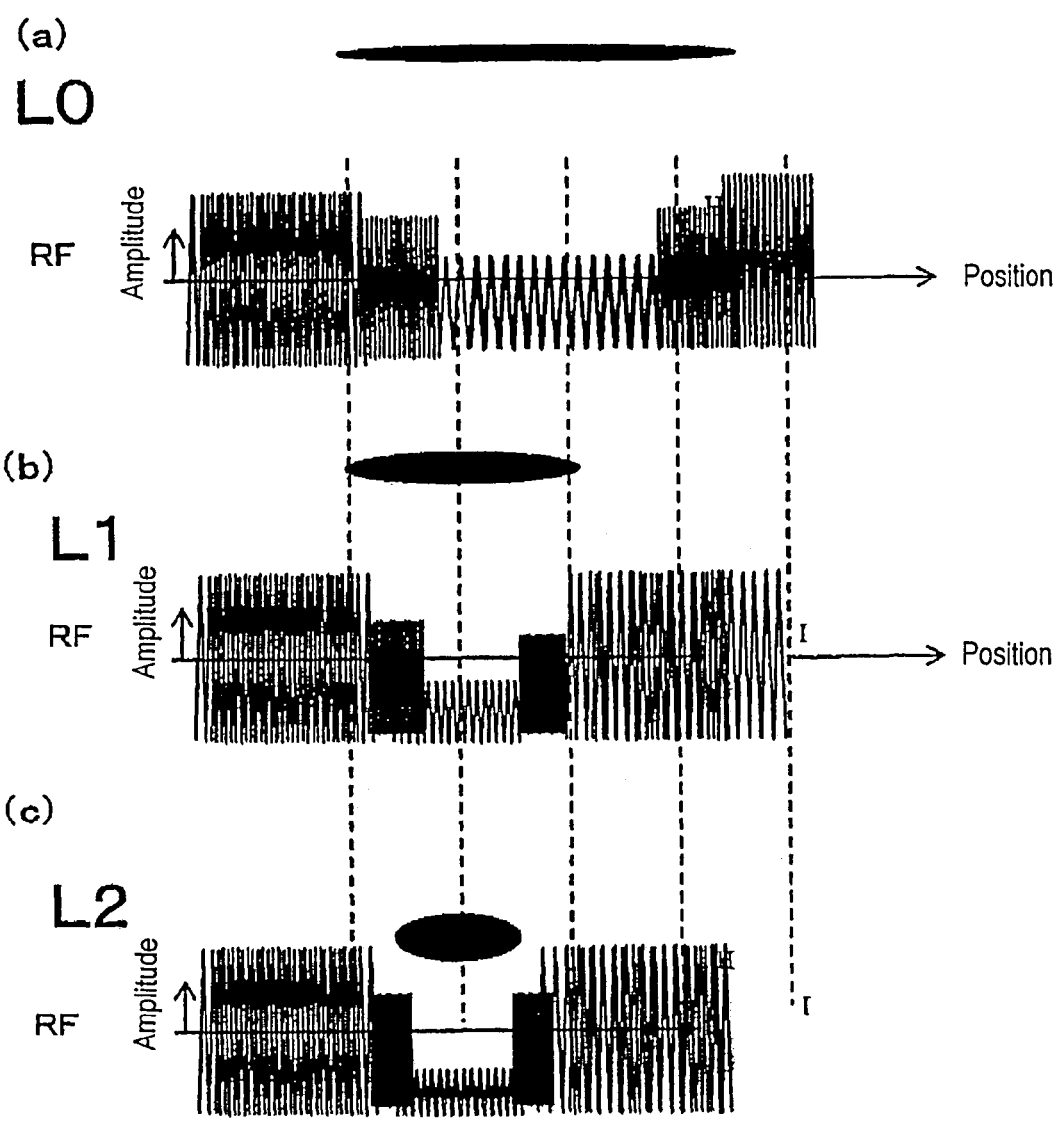
FIG. 8 (a), (b) and (c) schematically show relationships between an RF signal which is obtained when focus control is performed in the states shown in (a), (b) and (c) of FIG. 1, respectively, and a scratch on the disk surface.

In FIG. 8, (a), (b) and (c) schematically show relationships between an RF signal which is obtained when focus control is performed in the states shown in (a), (b) and (c) of FIG. 1, respectively, and a scratch on the disk surface. It is assumed that, as in the conventional case, the gain in the HPF 182 is prescribed to be the same in all of these cases.

As shown in FIG. 1(a), when the focal point of the light beam is positioned on the information recording layer L0, the amount of time during which the scratch 103 traverses the light beam becomes relatively long. FIG. 8(a) illustrates there being a long period during which a proper RF signal cannot be obtained due to the influence of the scratch 103. Specifically, the scratch 103 causes defocusing, such that there is a long period during which the RF signal temporary weakens. However, as described earlier, the scratch 103 accounts for a small areal proportion in the cross-sectional area of the light beam, and thus the influence of the scratch 103 is relatively small. Therefore, the fluctuations (flutter) of the RF signal before and after the light beam travels through the scratch 103 are small.

On the other hand, in the state of FIG. 1(b), the amount of time for which the light beam travels through the scratch is reduced, so that the period during which defocusing is caused by the scratch 103 is shorter. In the state of FIG. 1(c), the amount of time for which the light beam travels through the scratch is further reduced, and the period during which defocusing is caused by the scratch 103 is even shorter. Therefore, in the states of FIG. 1(b) and (c), as shown in FIG. 8(b) and (c), the fluctuations (flutter) of the RF signal before and after the light beam travels through the scratch 103 are large.

Thus, if the gain crossover frequency of the HPF 182 is prescribed at a constant value, as the position of the information recording layer which is the target of recording/reproduction becomes shallower, the influence of a scratch will become more concentrated so as to result in significant influences, and the weakening of the RF signal when traveling through a scratch will also increase, thus resulting in a worse amplitude deterioration. In the case of a serious deterioration in the amplitude of the RF signal, the data slicing feedback loop may also fail, making it even impossible to perform binarization.

With the optical disk apparatus of the present embodiment, too, a comparison between the signal characteristics concerning the information recording layers L0 and L1 would produce the results shown in FIG. 5. That is, the defocus margin is at ±0.2 μm for both, whereas the tilt margins (i.e., the radial tilt margin and tangential tilt margin) are greater for the information recording layer L1.

Figure 9:
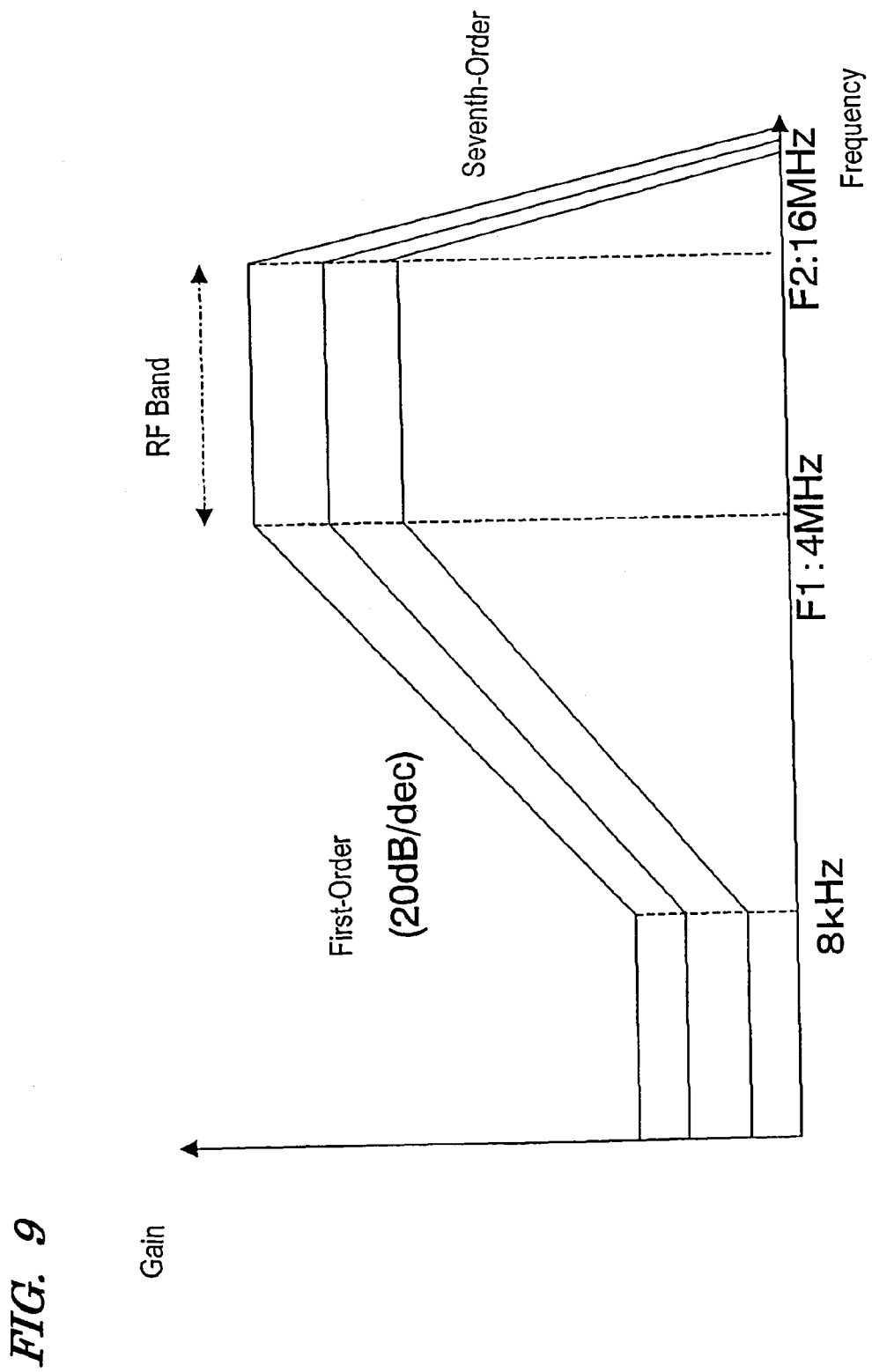
FIG. 9 A diagram showing the frequency characteristics of the gain of an HPF 182 included in an optical disk apparatus of Embodiment 2.

In the present embodiment, depending on the information recording layer, the high-frequency gain (i.e., gain in an RF band of frequencies of 1 MHz and above) of the HPF 182 is changed between three value, GH0, GH1 and GH2, as shown in FIG. 9. FIG. 9 shows the frequency dependence of the gain. At the standard readout speed of the BD, F1 and F2, which define the range of the RF band, are about 4 MHz and about 16 MHz.

More specifically, in the present embodiment, the high-frequency gain is prescribed at the value GH0 for the information recording layer L0, the value GH1 for the information recording layer L1, and the value GH2 for the information recording layer L2, such that a higher value is prescribed for the high-frequency gain as the position of the information recording layer becomes shallower. This makes it possible to ensure that substantially the same level of weakening of the RF signal will be caused by a scratch on the disk surface in all information recording layers.

When the high-frequency gain of the HPF 182 is increased, the high-frequency noise increases, and the signal quality deteriorates, whereby indices such as jitter and MLSE will be increased. However, as has been described with reference to FIG. 5, no increase in read errors will occur because the tilt margins will increase as the position of the information recording layer becomes shallower. Preferably, the value of the high-frequency gain for each information recording layer is prescribed at a value corresponding to the amount of increase in the tilt margins.

Note that, during the production process or like, the setting values of the high-frequency gain in the HPF 182 may be individually adjusted in accordance with variations in the resolution or aperture of the optical head, and written to an EEPROM so as to correspond to each layer. Alternatively, at booting of the optical disk apparatus, a move may be made to the region of a BCA (Burst Cutting Area) provided for the purpose of copyright protection or disk ID assignment, which exists at an inner peripheral region of the optical disk, and by regarding the BCA portion as a scratch, adjustments may be made based on RF amplitude or jitter-best efforts, so that the gain of the HPF becomes most immune against scratches. The adjusted gain setting values may be stored as table values in a RAM (not shown) which is internalized in the DSP 162, for example.

Based on gain setting values which are stored in an EEPROM (not shown) or a RAM, an interlayer move is to be made in such a manner that, immediately after the converging point of the light beam has moved to the target information recording layer, the gain setting value is updated to the gain setting value for that information recording layer. Data recording/reproduction is to be begun after the update of the gain setting value is completed.

In the present embodiment, gain switching is performed immediately after an interlayer move, rather than immediately before an interlayer move. If the gain setting in the HPF (i.e., an equalizer) is switched before a move, it becomes impossible to read the track address or sector address at that timing, and therefore it may be erroneously determined that focus servo and the like are failing. If such an erroneous determination is made, retries of focus lock-in and the like will be made, thus making it impossible to perform an intended interlayer move. Therefore, gain switching is preferably performed after an interlayer move, although it could also be performed before an interlayer move.

Thus, according to the present embodiment, even when the RF signal from an information recording layer which exists in a shallow position of a multi-layered disk has become weak due to a scratch or the like on the disk surface, a sufficient signal quality can be obtained through adjustment of the gain crossover frequency of servo control. Therefore, with respect to any one of the information recording layers, it is possible to reconcile the optical disk's stability against scratches with the quality of recording/reproduction, thus being able to provide a highly reliable apparatus.

Note that not only the high-frequency gain of the HPF 182 but the feedback gain of the data slice system of the binarization circuit 184 and/or the gain of the PLL loop may also be changed depending on the information recording layer. In this case, contrary to a servo system having a low response band, e.g., focus servo and tracking servo, the RF amplitude would be more decreased by a scratch on the disk surface as the position of the information recording layer becomes shallower. Therefore, as for these gains, it would be preferable to prescribe their values to become higher as the information recording layer becomes shallower, in order to enhance response characteristics against scratches. Also by increasing these gains, even if the PLL loop fails due to a scratch, for example, the PLL can be promptly locked-in after traveling through the scratch on the disk surface. Although jitter and the like will be deteriorated by increasing these gains, but such deteriorations will be counteracted by increased tilt margins.

Embodiment 3

As has been described with reference to FIG. 8, the weakening of the amplitude of the RF signal which is caused by a scratch on the disk surface becomes more intense as the position of the information recording layer becomes closer to the disk surface. This also affects the PLL (Phase Locked Loop). A PLL is a known circuit for ensuring that the frequency of an output signal coincides with that of an input signal or a reference frequency. It detects a phase difference between the input signal and the output signal, and is able to generate a signal which is accurately synchronized with the reference frequency, by means of a voltage controlled oscillator (VCO).

Since the PLL of an optical disk apparatus operates on the basis of an RF signal, if a scratch exists on the disk surface, it may not be possible to perform proper PLL operation at an information recording layer near the disk surface. Therefore, it is preferable that the gain of the PLL is prescribed to be a greater value as the information recording layer becomes shallower. While an information recording layer which is at a relatively shallow position is being accessed, even if the amplitude of the RF signal greatly weakens due to a scratch on the disk surface, failure is not likely to occur so long as binarization is possible and a clock is being extracted. Furthermore, even if the PLL does fail, the lock-in performance is enhanced because of the increased gain; therefore, a prompt re-lock-in is possible after traveling through the scratch.

Note that increasing the PLL gain will generally invite a greater likeliness to respond to noise and the like. Therefore, due to random noise which is generated in a stationary state, etc., the clock for data extraction will have a large jitter. However, since the tilt margins will increase as the position of the information recording layer becomes shallower, occurrence of read errors is suppressed also in this case.

The optical disk apparatus according to the present invention may have a structure in which Embodiments 1 to 3 are combined in any arbitrary manner. For example, both the gain of focus control and the PLL gain may be allowed to change with respect to each information recording layer.

In each of the above embodiments, one optical disk includes three information recording layers L0 to L2. However, the optical disk may include two layers of information recording layer, or four or more layers of information recording layers. Moreover, it is not necessary to change the gain characteristics with respect to every information recording layer. For example, identical gain characteristics (i.e., the same gain crossover frequency or high-frequency gain) may be prescribed for the information recording layers L0 and L1, while the gain characteristics of only the information recording layer L2, which is the closest to the surface, is changed.

INDUSTRIAL APPLICABILITY

The optical disk apparatus according to the present invention is able to stably perform data recording/reproduction for a multi-layered optical disk. In particular, when making an optical access to an information recording layer that is located close to the surface of the optical disk, the FE signal and the RF signal are susceptible to unfavorable influences of a scratch which is formed on the disk surface, etc. However, with the optical disk apparatus according to the present invention, such influences can be reduced, and the signal quality can be enhanced.

The present invention will exhibit particularly advantageous effects when performing data recording/reproduction for a bare BD.

The invention claimed is:

1. An optical disk apparatus capable of reading data from an optical disk which has a plurality of information recording layers, including a first information recording layer whose distance from a disk surface is relatively small and a second information recording layer whose distance from the disk surface is relatively large, comprising:
   a light source for radiating a light beam;
   a lens for converging the light beam radiated from the light source;
   focus control means for causing a converging point of the light beam to be positioned on an arbitrary information recording layer of the optical disk;
   tracking control means for causing the converging point of the light beam to be positioned on a predetermined track of the information recording layer; and
   gain setting means capable of changing gain characteristics of at least one of the focus control means and the tracking control means, wherein,
   the gain setting means prescribes a first gain crossover frequency when reading data from the first information recording layer to be a value which is lower than a second gain crossover frequency when reading data from the second information recording layer; and
   a depth of the first information layer from the disk surface is between 50 μM and 100 μm.

2. The optical disk apparatus of claim 1, wherein, when making a move of the converging point of the light beam from a current information recording layer to another target information recording layer, the gain crossover frequency is changed, before the move of the converging point is completed, from a value for the current information recording layer to a value for the other target information recording layer.

3. The optical disk apparatus of claim 1, wherein a distance between the disk surface and the second information recording layer is 100 μm or less.

4. The optical disk apparatus of claim 1, wherein the gain setting means stores a parameter defining respective gain characteristics for the plurality of information recording layers.

5. The optical disk apparatus of claim 4, wherein, at booting, the gain setting means performs a learning for adjusting the parameter in accordance with each mounted optical disk.

* * * * *